United States Patent

[11] 3,578,275

| [72] | Inventors | Marshall S. Kriesel<br>St. Paul;<br>Lawrence Anderson, Fridley; Paul E.<br>Ericson, Minneapolis, Minn. |
|---|---|---|
| [21] | Appl. No. | 847,170 |
| [22] | Filed | Aug. 4, 1969 |
| [45] | Patented | May 11, 1971 |
| [73] | Assignee | Aerospace Systems Company<br>Minneapolis, Minn. |

[54] REEFING LINE CUTTER WITH ATTACHABLE TRIGGER ELEMENT
5 Claims, 4 Drawing Figs.

[52] U.S. Cl. ........................................................ 244/152
[51] Int. Cl. .................................................... B64d 17/34
[50] Field of Search ............................................ 244/149, 152, 147, 142

[56] References Cited
UNITED STATES PATENTS

| 2,432,920 | 12/1947 | McKay et al. .................. | 244/142(X) |
| 3,049,322 | 8/1962 | Vlasic ............................ | 244/152 |
| 3,348,793 | 10/1967 | Kriesel et al. .................. | 244/152 |

FOREIGN PATENTS

| 714,407 | 8/1954 | Great Britain ................ | 244/149 |

Primary Examiner—Milton Buchler
Assistant Examiner—James E. Pittenger
Attorney—Dugger, Peterson, Johnson & Westman ABSTRACT: A device to positively position a triggering element for a reefing line cutter onto the parachute canopy an suspension lines so that the trigger element is at a predetermined orientation with respect to the ground during the drop to make the trigger element operation reliable.

Patented May 11, 1971 3,578,275

INVENTORS
MARSHALL S. KRIESEL
LAWRENCE ANDERSON
PAUL E. ERICSON

BY
Dugger Peterson Johnson & Westman
ATTORNEYS

Patented May 11, 1971

INVENTORS
MARSHALL S. KRIESEL
LAWRENCE ANDERSON
PAUL E. ERICSON

BY Dugger, Peterson, Johnson & Westman

ATTORNEYS

REEFING LINE CUTTER WITH ATTACHABLE TRIGGER ELEMENT

BACKGROUND OF THE INVENTION

1. Field of the Invention

The present invention relates to devices for attaching reefing line cutters to reefing lines of parachutes and to the suspension lines thereof.

2. Prior Art

Reefing line cutters, such as that shown in U.S. Pat. No. 3,348,793 to Marshall S. Kriesel et al. are used for cutting a line used to "reef" a supply drop parachute at a predetermined time so that the drop can be accurately made, and the parachute will be fully inflated, (unfurled) at the time the load contacts the ground.

Ordnance systems for actuating the reefing line cutters are commonly known, as well as altitude sensitive (barometric pressure) devices. At the present time, there has been work done on altitude sensing devices comprising small radar packages that have a trigger element that detonates the ordnance. The radar sensors are merely miniaturized, short pulse ranging radar of known operational characteristics that will accurately sense distance above terrain including hills and trees so that the reefing line cutter will be actuated to disreef the portable canopy and allow full inflation at the proper altitude for accurate drop.

In using such altitude sensors it is important that the antenna of the radar be properly positioned with respect to the ground or the direction of drop. The means for attaching the sensor thus has to go not only onto the parachute canopy and the canopy loops as is shown in the cutting device of U.S. Pat. No. 3,348,793 but also onto the suspension lines so that the sensing device's orientation with respect to the ground is maintained throughout the drop.

SUMMARY OF THE INVENTION

Means on detonating element for reefing line cutters for quickly attaching the element to a line in order to keep the element oriented positively with respect to the ground or with respect to the load. The means for positioning the device comprises a plurality of spaced staggered partially opened clips between which the suspension line can be threaded, and which are slightly resilient so that when the suspension line is pulled taut it will automatically thread into position in the clips.

DESCRIPTION OF THE PREFERRED EMBODIMENTS

Figure 1:
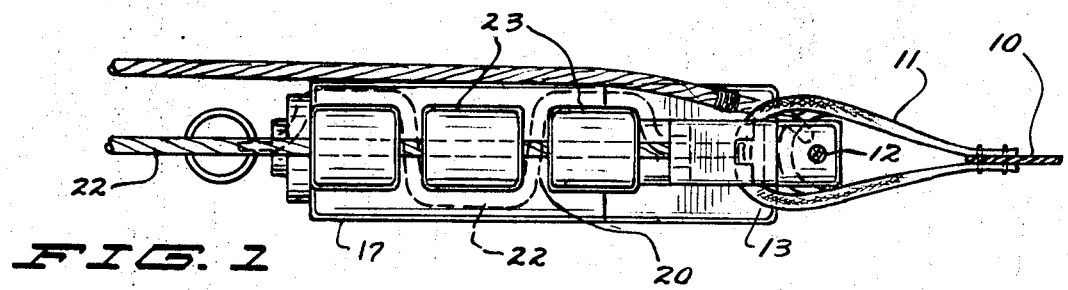
FIG. 1 is a top plan view of an attaching lacing device made according to the present invention.
Figure 2:
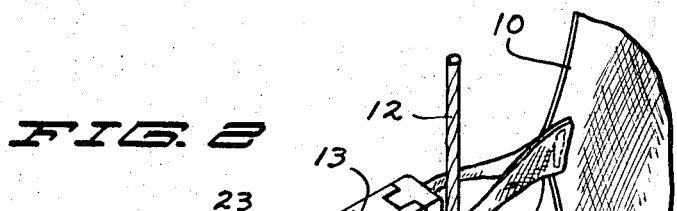
FIG. 2 is a perspective view of the device of FIG. 1 showing a portion of the parachute canopy and the suspension lines.
Figure 3:
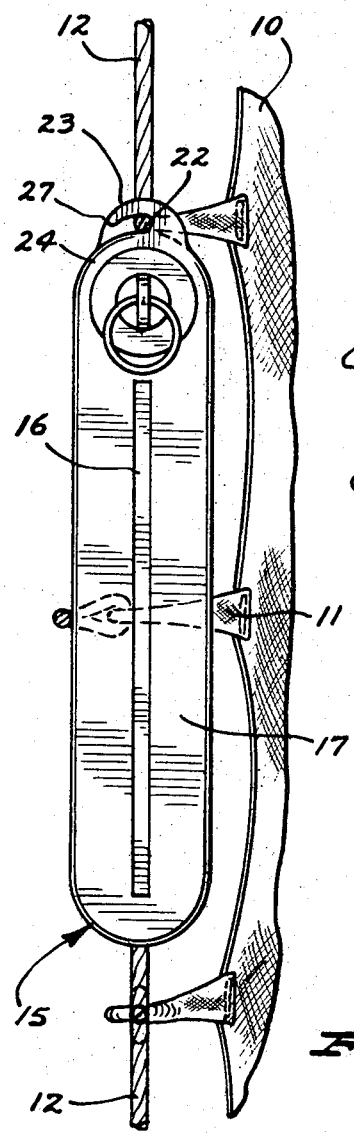
FIG. 3 is a bottom plan view of the device of FIG. 2.

A parachute canopy or shroud 10 which is shown only fragmentarily, has a plurality of canopy loops 11 fastened around the lower hem or peripheral edge thereof, and a reefing line 12 is used for reefing the parachute. This construction is shown in U.S. Pat. No. 3,348,793. Also, a reefing line cutter 13 which is made exactly the same as that shown in U.S. Pat. No. 3,348,793 is in place with the reefing line 12 passing through a provided opening in the cutter, and thus in place to be severed upon detonation of the cutter.

The reefing line cutter has a latch which locks onto one of the canopy or shroud loops 11, and this latch is locked in place with the locknut 14. The locknut 14 also is used as a connector for attaching a cutter trigger assembly 15. The trigger assembly 15 as shown is one that is dependent upon its relative altitude for detonation, and has an outer case 17 housing a radar unit (not shown) which senses the altitude above the ground. The radar unit can be any conventional radar circuitry and in solid state form for miniaturization, and is low power (it carries its own batteries) and short range. When the radar unit is a certain height above the ground, it triggers a circuit to detonate the explosive cartridge in the reefing line cutter in a known manner. The case has a slot antenna 16 at the bottom surface thereof, and it is important that this slot antenna remain oriented with respect to the ground during descent of the parachute so that the radar is aimed at the ground. In order to do this, the case 17 has quick lace hooks illustrated generally at 21 on a side thereof which is at right angles to the surface that is to be maintained perpendicular to the ground, and these hook assemblies can be latched onto one of the suspension lines 22 which are conventional in parachutes and which are attached to the loops 11. As shown, the hook assembly comprises curved resilient hook-shaped members 23 which are integral with the case 17 (they can be integrally molded) and oriented so that they have open portions 24 alternating as to direction of opening along the length of the assembly. The suspension line 22 can be laced in spaces 20 between hooks 23 as shown in dotted lines in FIG. 1, pulled taut, and the hooks 23 will open slightly to let the suspension line snap into place. The unit also can have open face hooks 25 which are alternated just as the hooks 23, and are open to permit lacing the reefing line 12 into place to keep the case 17 positively positioned with respect to the reefing line and with respect to the suspension lines. Then when the parachute is descending, the suspension lines will be oriented up and down because the load will be toward the bottom of the suspension lines and the parachute will be above the case 17. This will orient the antenna 16 in proper position. The hooks 23 are resilient, and the locknut 14 is formed right into the case 17 so that the case will attach to the reefing line, and the hooks will hold the case 17 in proper position with respect to the suspension lines 22.

Thus proper directional orientation is maintained. The fastening can be done quickly by using open faced resilient hooks that are alternating so that the line can be threaded between them as shown in dotted lines in FIG. 1 and then snapped into place because the hooks will be slightly resilient and will open at their outer ends 27 slightly to let the reefing line 22 pass underneath. It should be noted that the openings 24 at the outer ends 27 are slightly smaller than the diameter of the reefing line to permit the reefing line from coming undone. The hooks can be made of a suitable plastic material or if desired a resilient metal.

A safety arming switch 28 is shown in place in the unit here, but this is to be removed before the unit was extracted.

Figure 4:
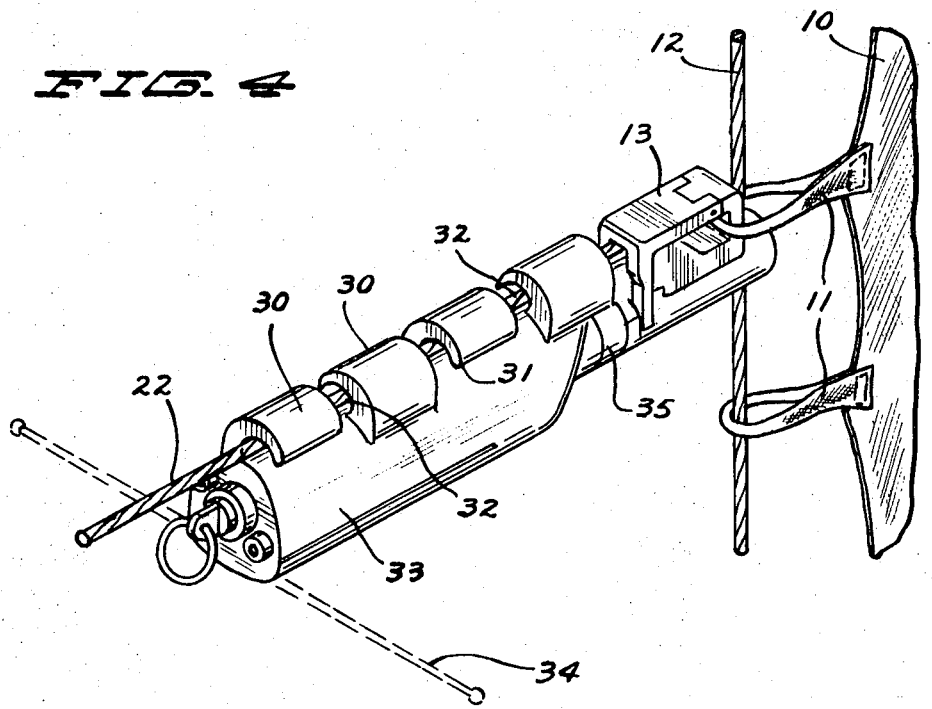
FIG. 4 is a perspective view of a second form of the invention showing a different type of trigger element.
Figure 5:
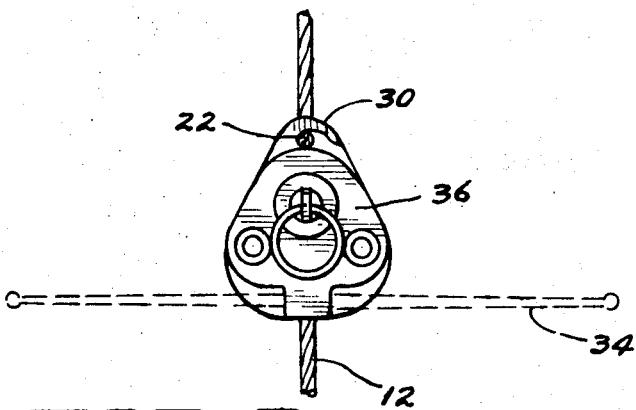
FIG. 5 is a bottom plan view of the device of FIG. 4.

FIGS. 4 and 5, the same type of clip arrangement is utilized. Here the cutter 13 is in place on a reefing line 12 of the canopy 10 and over a canopy loop 11 as in the previous showing. The cutter again is of the same construction and has the little clip that will open so that not only does the reefing line pass through the body of the cutter, but also the clip hooks onto one of the canopy loops to keep it in position. The suspension line 22 comprising from the canopy loop is laced between open faced hooks 30 which alternate in direction of opening on opposite sides of the suspension line, and have space 31 at the outer ends to permit the suspension line 22 to be threaded alternately in the spaces 32 between the clips (as shown in FIG. 1), then pulled taut so that the resilient clips will give slightly and let the suspension line 22 come to position as shown in FIGS. 4 and 5. Here, the body 33 on which the clips are mounted houses a radar unit which has a dipole antenna 34 that can be folded back against the body 33 and will automatically erect when it comes down. Again, the orientation of the body 33 is of importance because the radar package is used here as well for detonating or triggering the charge of the explosive line cutter. A coupling 35 is utilized between the body 33 and the cutter 13 to hold its position. The bottom surface 36 of the body 33 is thus maintained facing the ground during descent, the and the antennas 34 are in proper position for altitude sensing this descent. The proper position of the radar altitude sensing unit, which is so critical to get a correct altitude measurement, is maintained by the fact that the suspension lines 22 extend up and down because the load is at the lower end of the suspension lines and the canopy 10 is at the upper end of the suspension lines and the speed lacing clips 30 help in the prompt application of the body 33 to a suspension line to which the cutter 13 is attached insuring that the unit will be properly oriented during descent.

Again the longitudinal spacing 32 between the clips 30 is greater than the diameter of the suspension line, and the openings between the body and the outer ends of the clips 30 is less than that of the suspension line.

Thus there are means provided by the clips for maintaining a detonating element in proper relationship with respect to a suspension line of a reefed parachute and used combination with a reefing line cutter for obtaining this proper orientation.

We claim:

1. In a reefing line cutter assembly including detonating means and having an outer housing, the improvement comprising means for orienting the position of said cutter and detonating means with respect to a parachute line including at least three clip members fastened to the housing, said clip members having base portions alternating in position on either side of a reference line extending in the proper direction of orientation of said parachute line and outer end portions overlying the imaginary line, the outer edge of said outer end portions being spaced from the housing a distance less than the thickness of the parachute line, said clips being spaced apart in longitudinal direction of said imaginary line a distance greater than the thickness of said parachute line.

2. The device of claim 1 wherein the clips are resilient at their outer end portions and spring away from the housing to permit the parachute line to be positioned adjacent the base portion of each clip and to be retained by said outer end portions.

3. The device of claim 1 wherein the detonating unit is directional sensitive and the parachute line comprises a suspension line.

4. The device of claim 3 wherein said detonating unit has a sensing antenna oriented in a predetermined position with respect to the ground.

5. The device of claim 3 wherein the detonating unit includes a radar sensing portion inside the housing and is positioned adjacent the lower skirt of the parachute.